United States Patent [19]

Gilovich

[11] 4,285,016
[45] Aug. 18, 1981

[54] DISC, TAPE AND HYBRID DISC-TAPE MEMORY APPARATUS AND DRIVE ASSEMBLY

[75] Inventor: Paul A. Gilovich, Saratoga, Calif.

[73] Assignee: Microcomputer Systems Corp., Sunnyvale, Calif.

[21] Appl. No.: 45,215

[22] Filed: Jun. 4, 1979

[51] Int. Cl.³ .................... G11B 5/55; G11B 21/08
[52] U.S. Cl. ...................... 360/84; 360/98; 360/106; 360/107; 360/130.24
[58] Field of Search .............. 360/84, 83, 97–99, 360/137, 103, 104–107, 130.22–130.24, 78, 75; 346/136–137

[56] References Cited

U.S. PATENT DOCUMENTS

| | | | |
|---|---|---|---|
| 2,694,110 | 11/1954 | Roberts | 360/78 |
| 2,873,926 | 2/1959 | Roberts | 360/78 |
| 3,047,869 | 7/1962 | Marcum et al. | 360/98 |
| 3,075,049 | 1/1963 | Gordon et al. | 360/84 |
| 3,197,575 | 7/1965 | Eckstein | 360/84 |
| 3,778,559 | 12/1973 | Kihara et al. | 360/84 |
| 4,005,490 | 1/1977 | Duncan et al. | 360/97 |
| 4,021,857 | 5/1977 | Tanimura | 360/84 |
| 4,101,945 | 7/1978 | Butsch | 360/97 |
| 4,117,519 | 9/1978 | Shioyama et al. | 360/84 |

OTHER PUBLICATIONS

G. L. Hollander, Data Processing with a Quasi-Random-Access Memory, Instruments and Automation, vol. 29, No. 4, Apr. 1956, p. 690.

Primary Examiner—Alfred H. Eddleman
Attorney, Agent, or Firm—Flehr, Hohbach, Test, Albritton and Herbert

[57] ABSTRACT

A drive assembly for driving disc, tape or disc-tape hybrid apparatus. A tape apparatus for mass storage in which rotating heads record longitudinal adjacent tracks of predetermined length on a tape to form blocks of recorded data. The tape is advanced to write or read a plurality of blocks. Also provided is a hybrid apparatus which combines the tape apparatus and disc apparatus in a unit which is driven from a common drive assembly.

13 Claims, 12 Drawing Figures

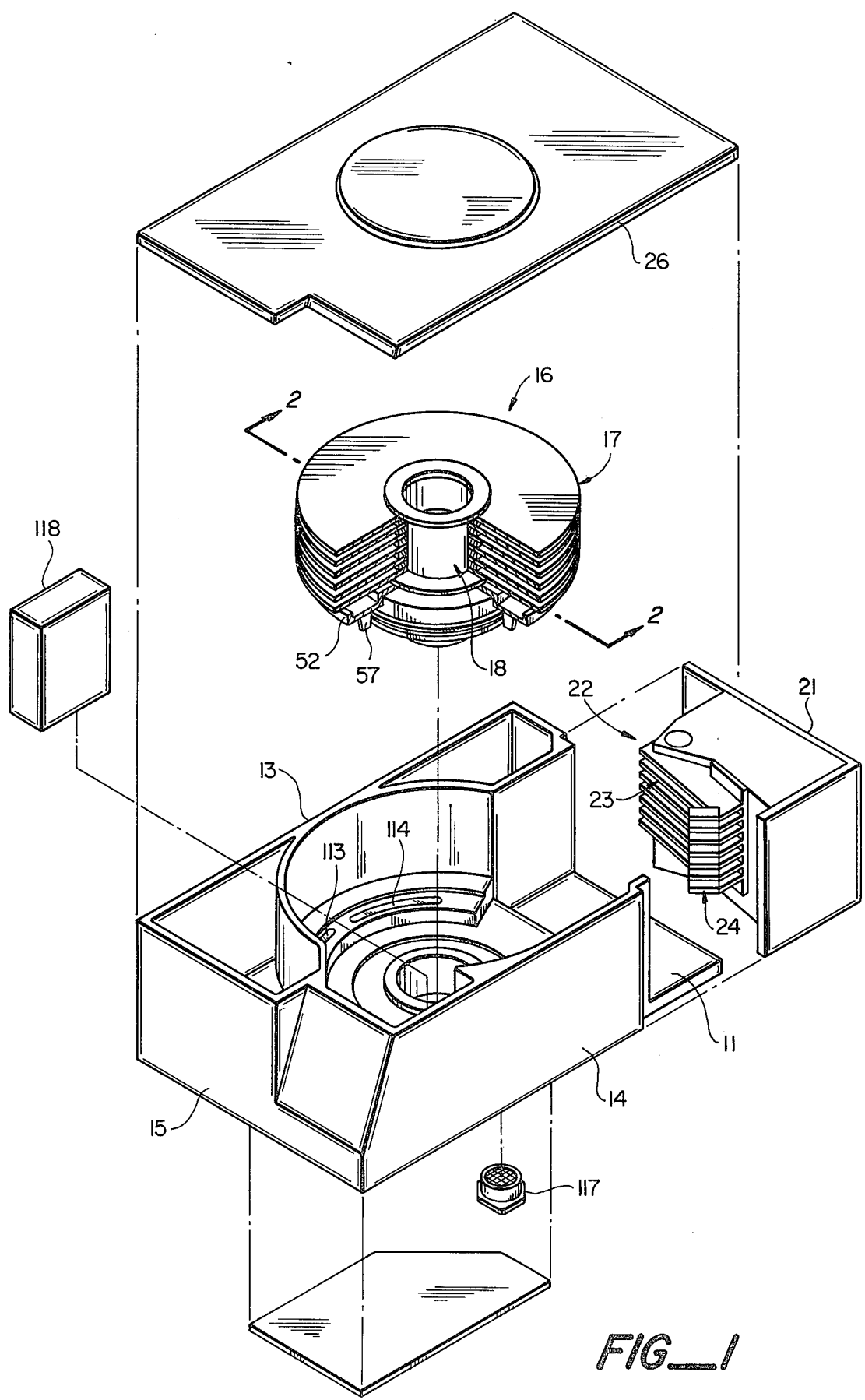

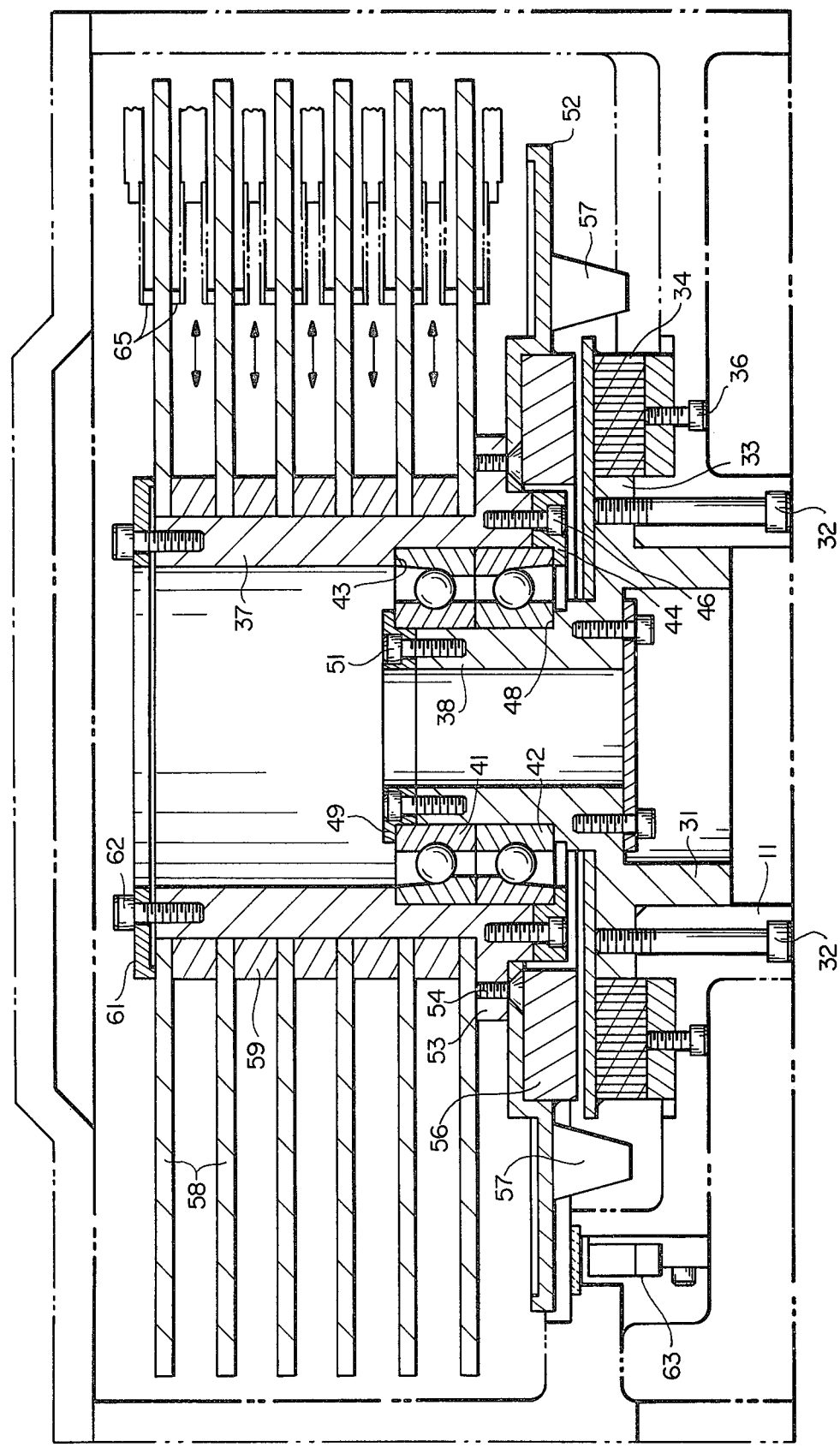
FIG_2

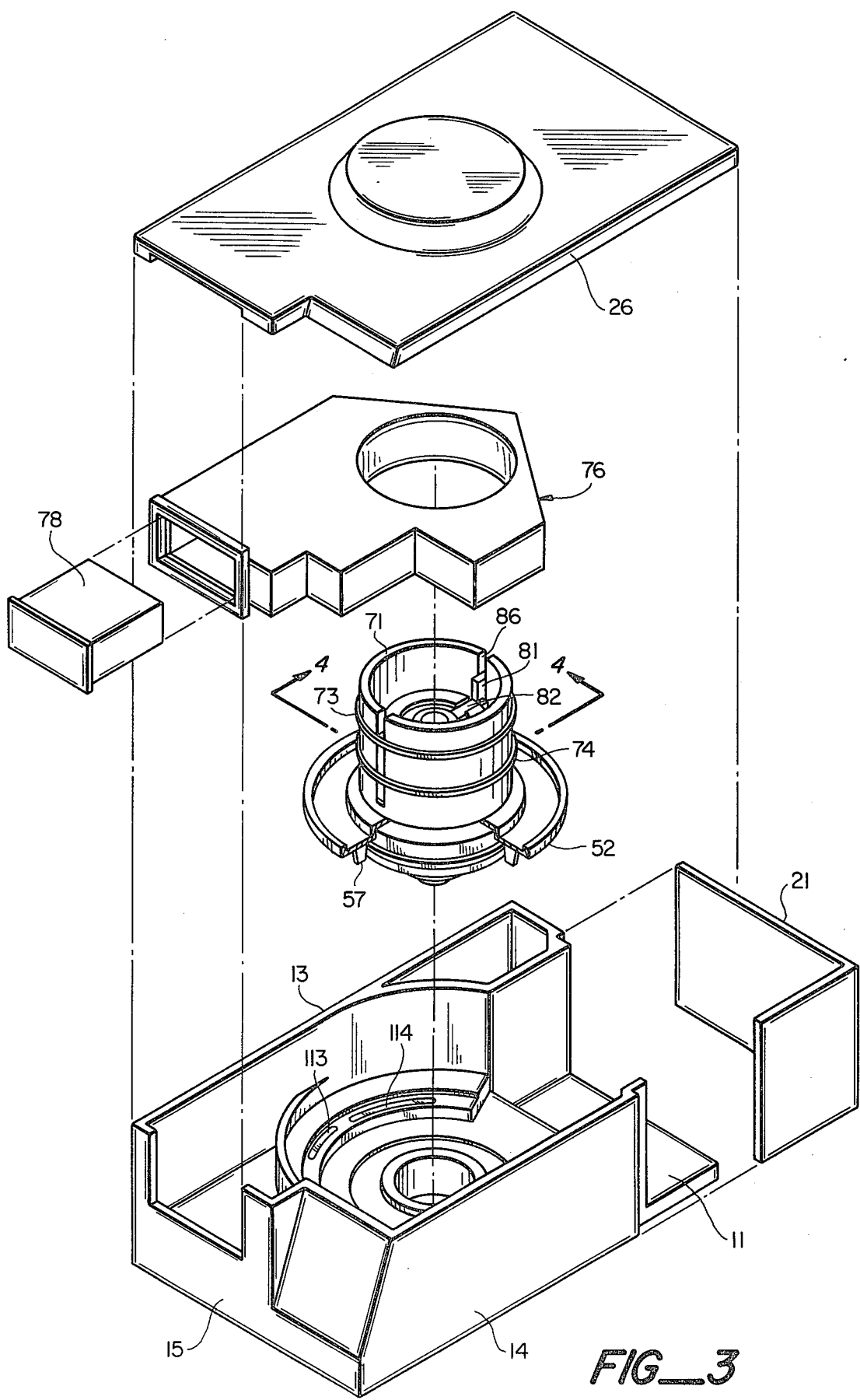
FIG_3

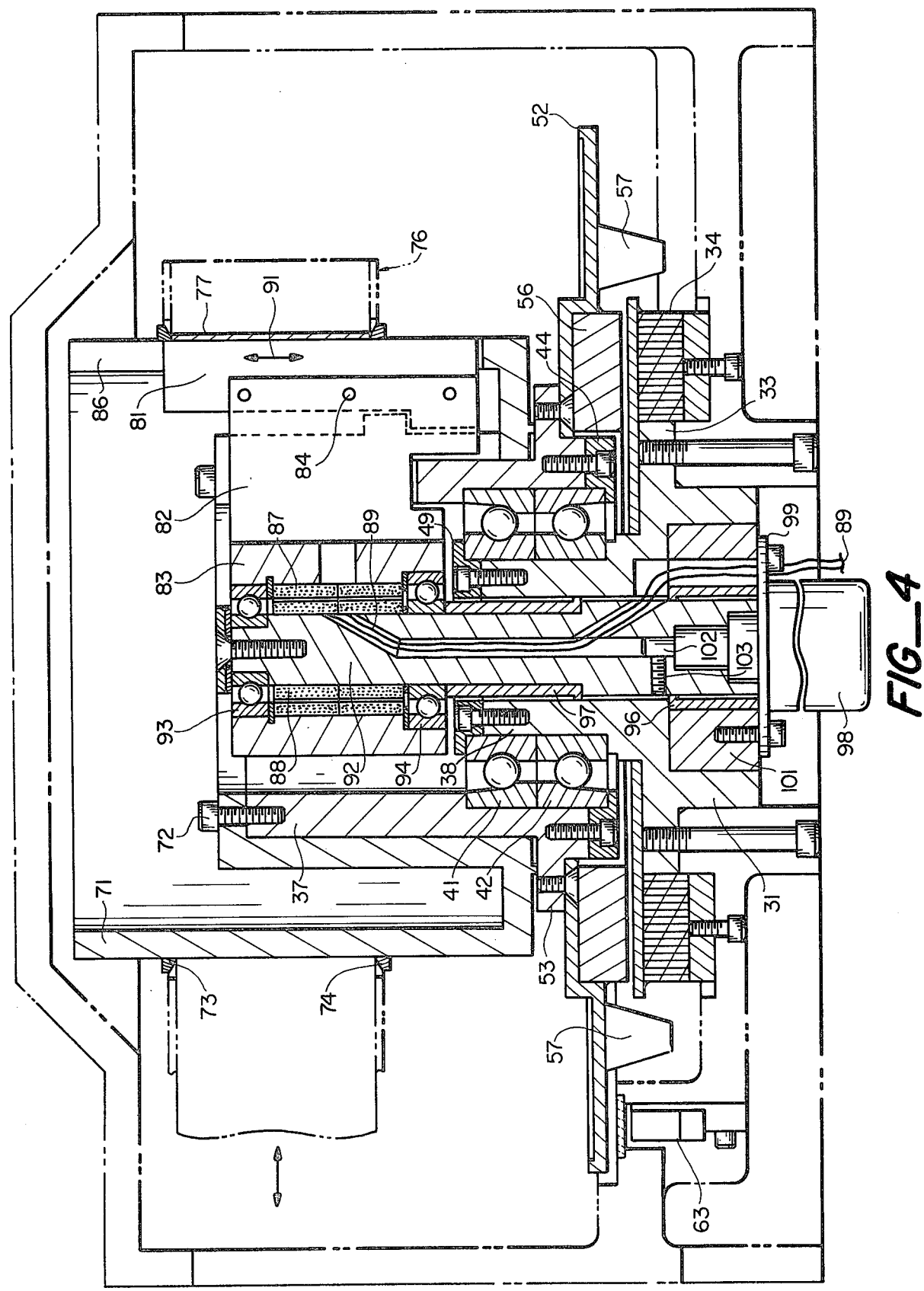
FIG_4

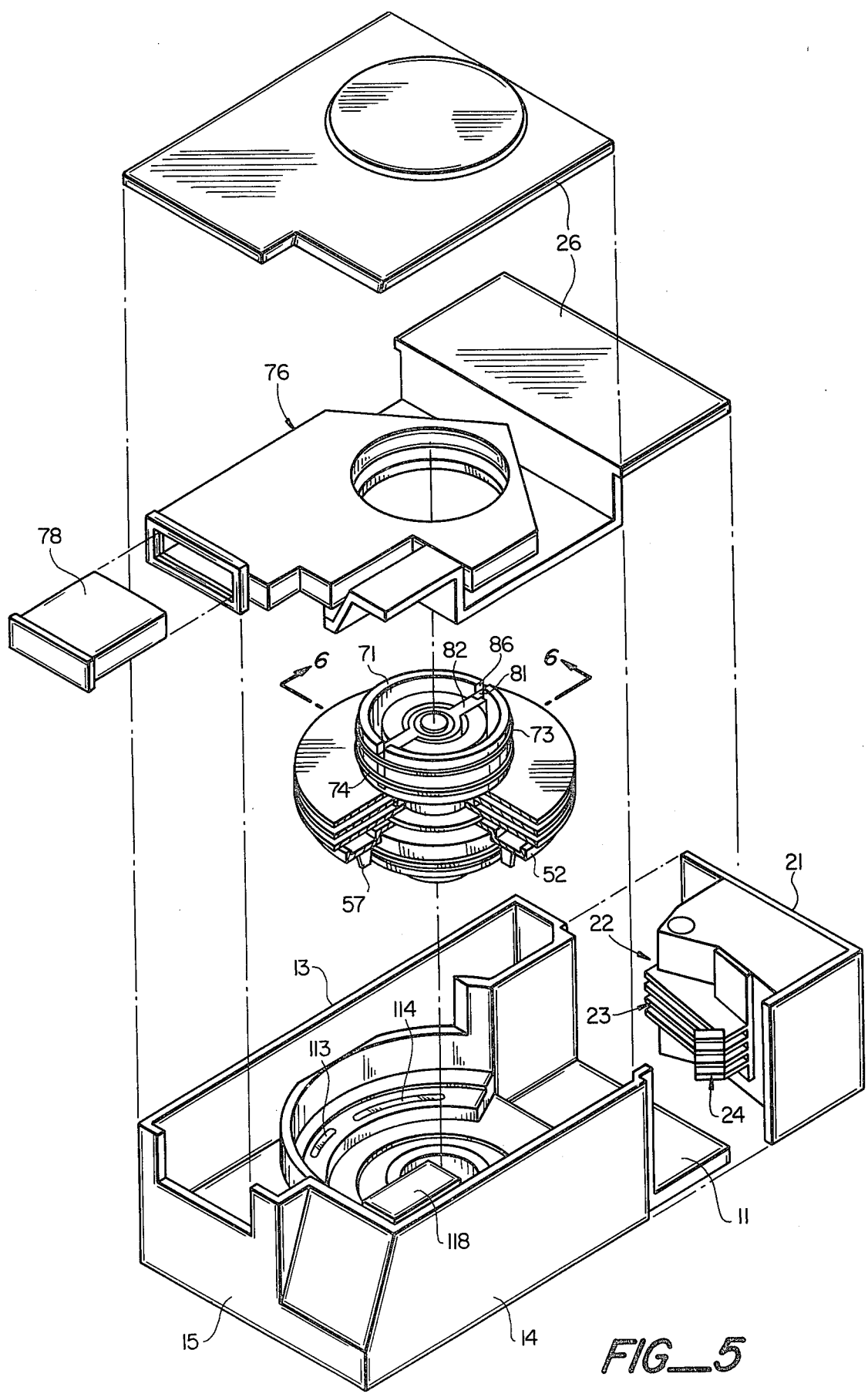
FIG_5

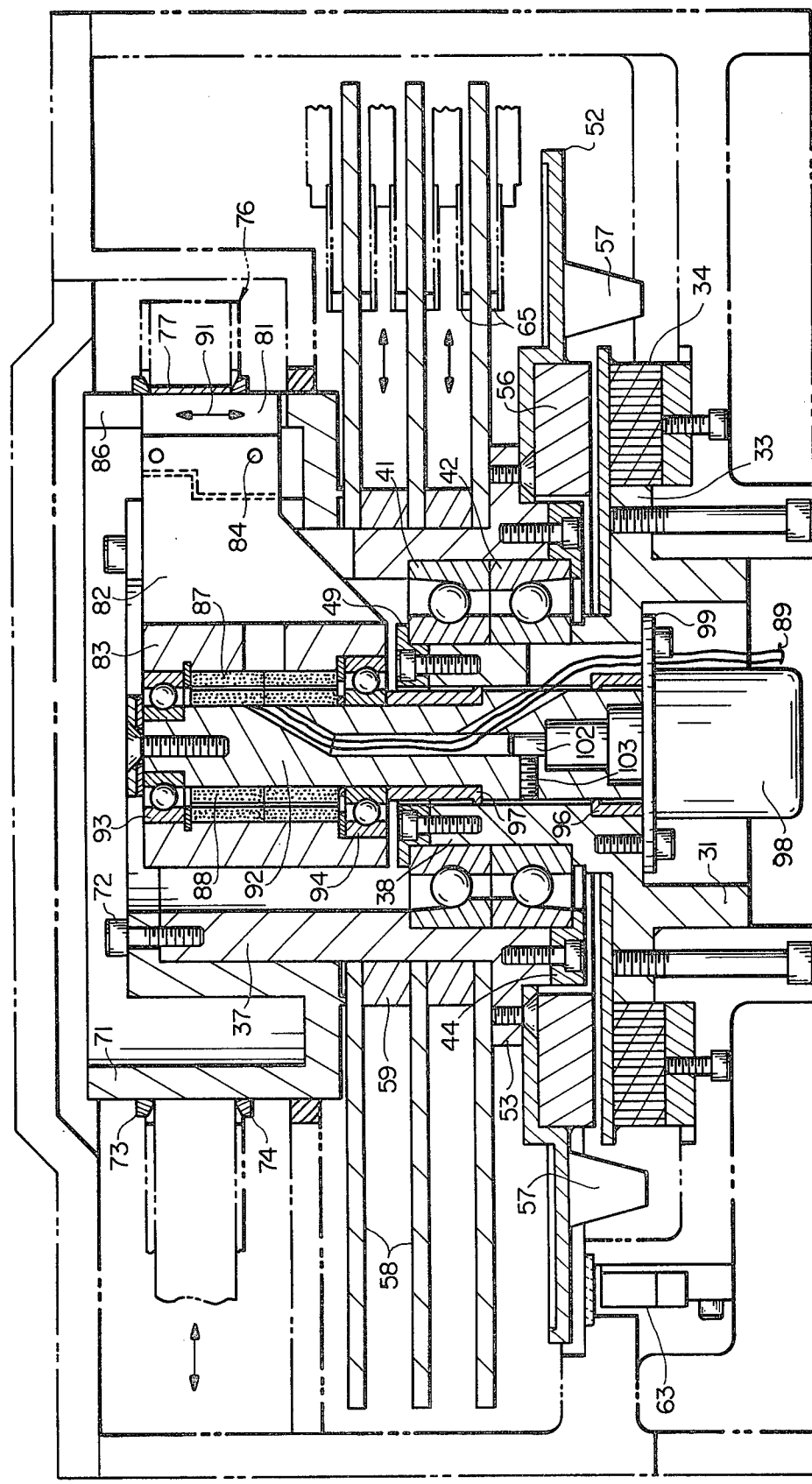
FIG_6

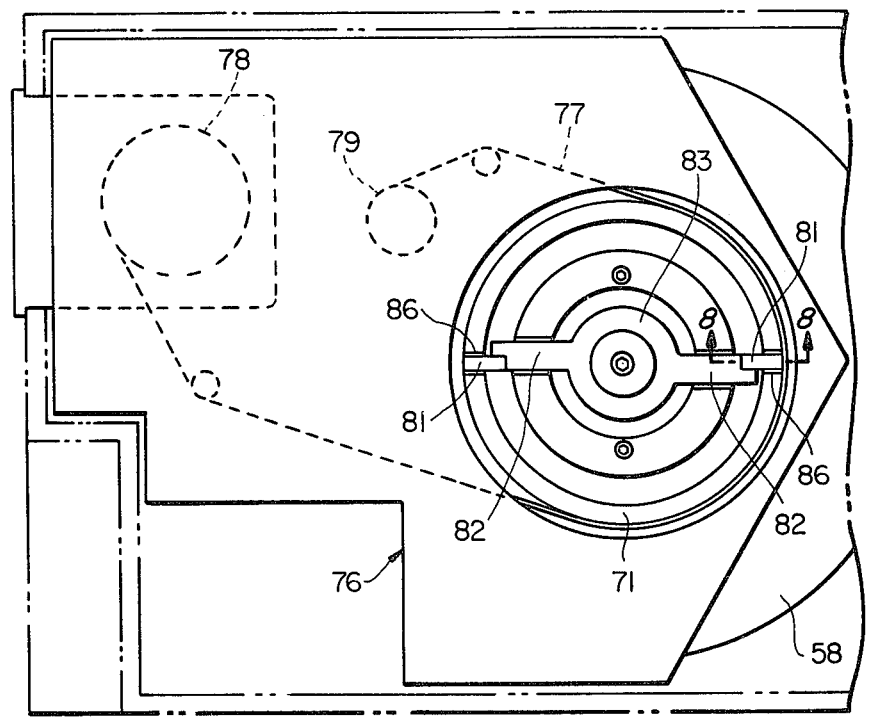
FIG_7
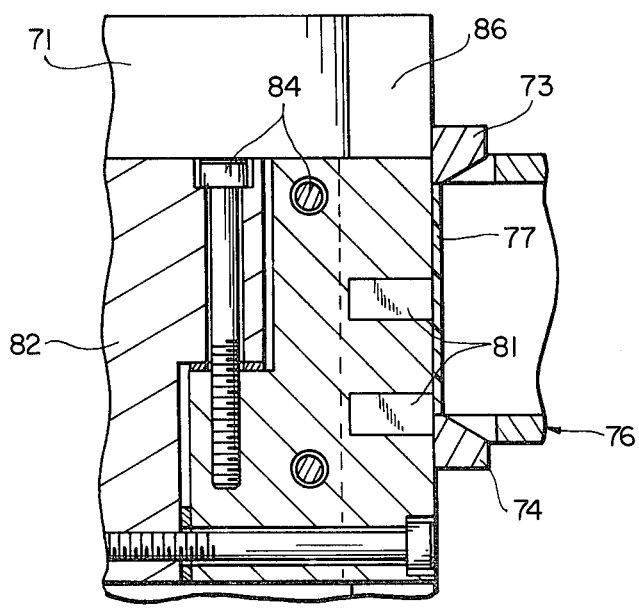
FIG_8

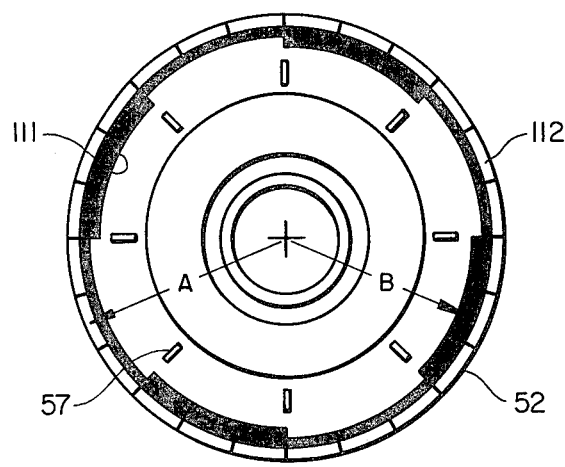
FIG_9
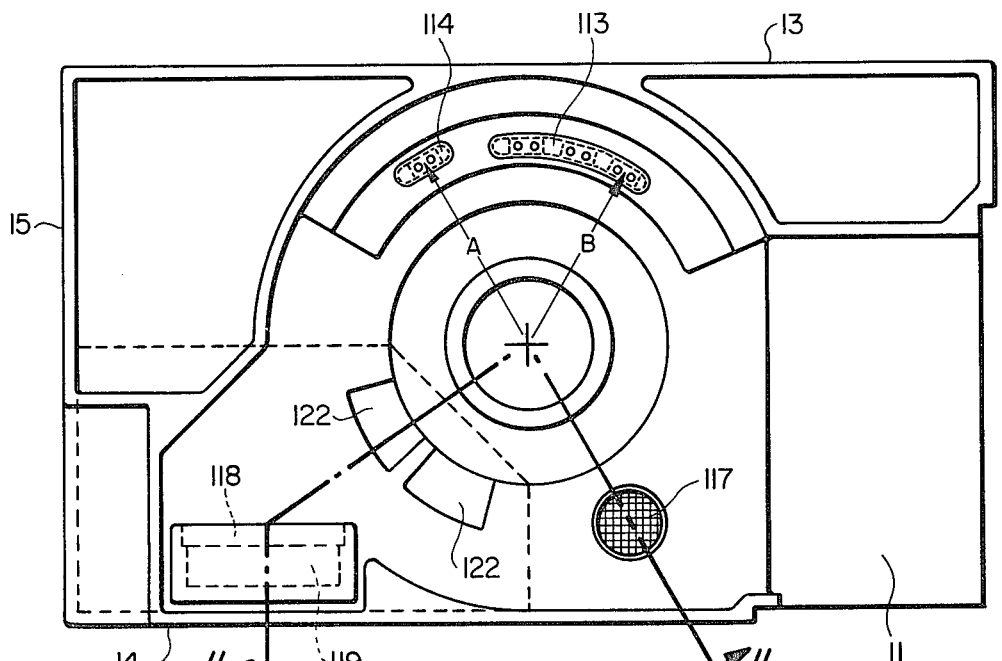
FIG_10
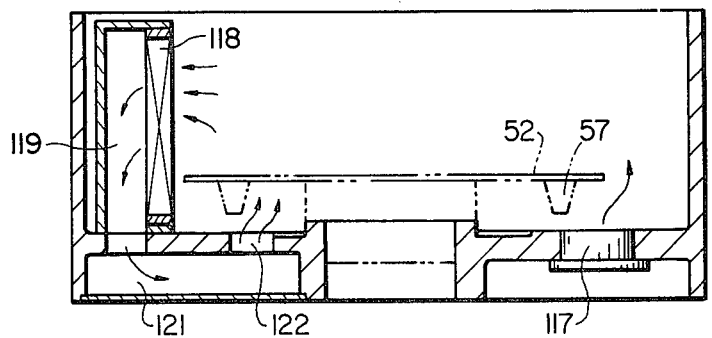
FIG_11

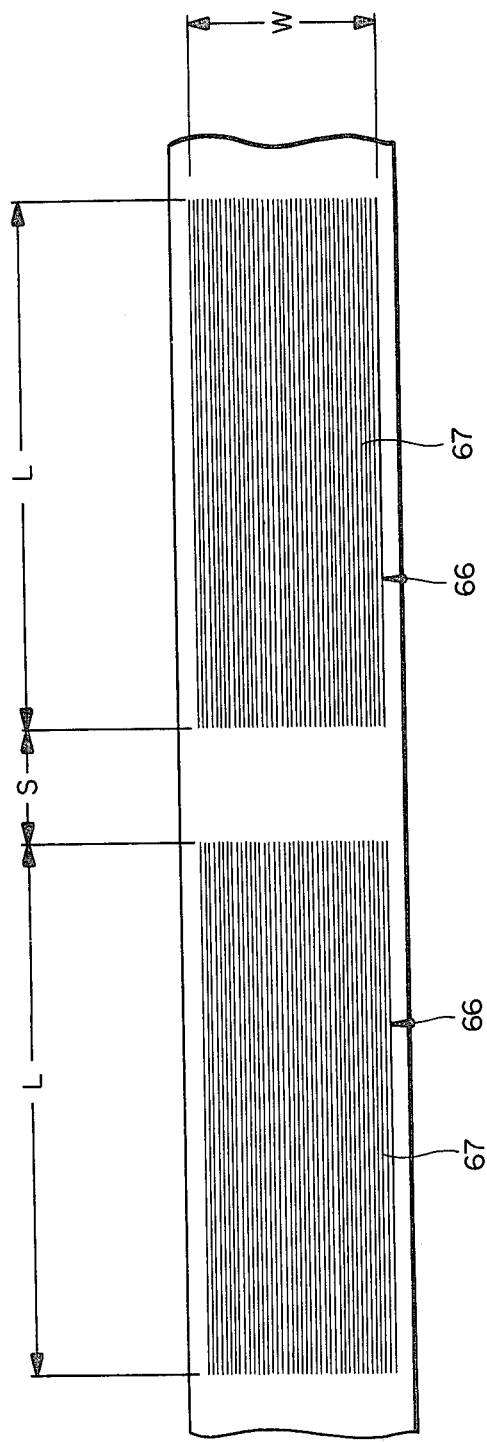
FIG_12

DISC, TAPE AND HYBRID DISC-TAPE MEMORY APPARATUS AND DRIVE ASSEMBLY

This invention relates to fixed disc, magnetic tape and hybrid disc-tape apparatus and to a drive assembly for such apparatus.

Disc drives have included a base which rotatably supports a hub. A motor mounted on the base drives the hub by means of a drive belt. Memory discs are mounted on the hub and are then rotated. A plurality of read-write heads are mounted on a head actuator mounted on the base adjacent the discs and serves to position the heads on the discs to write and read information on the discs as the discs are rotated past the heads. The indirect belt drive may introduce speed variations in the disc.

Magnetic tape drives have included drives which draw the tape longitudinally past one or more fixed magnetic heads to write and read longitudinally along the tape. The drive moves the tape continuously or intermittently past the heads. The tape must be moved past the head at constant velocity. In general, a plurality of heads are provided to read and write a plurality of adjacent tracks. The data transfer rates are relatively slow. Various apparatus have been employed to present the tape to the heads. Vacuum columns have been used to support lengths of tape extending between reels whereby the tape can be rapidly accelerated to speed to write or read record blocks. Other apparatus has employed tight loops to maintain a length of tape independent of the reels. Cartridges have also been employed in which the tape is driven by a tensioned belt to provide rapid start-stop capability and uniform velocity. All such systems are relatively complicated and expensive.

Another type of magnetic tape apparatus has been the helical scan apparatus whereby one or more rotating magnetic heads read and write a plurality of adjacent transverse tracks on the tape as the tape is moved past the heads. The data transfer rates can be relatively high.

There is a need in the computer field for an inexpensive memory which can provide fixed disc capability with backup storage. There is a need for an inexpensive magnetic tape apparatus to provide backup storage for fixed disc memories.

It is an object of the present invention to provide an inexpensive fixed disc memory system with a backup magnetic tape system capable of high speed data transfer rates.

It is another object of the present invention to provide a drive assembly for driving discs in cooperation with write-read optical heads.

It is another object of the present invention to provide a drive assembly for driving a tape drum and magnetic heads in cooperation with a magnetic tape.

It is a further object of the present invention to provide an improved disc drive.

It is another object of the present invention to provide an improved magnetic tape recording and reproducing apparatus.

It is a further object of the present invention to provide a magnetic tape apparatus in which the tape is stationary and supported on an air bearing with one or more magnetic heads moved at a constant velocity over said tape to write and read adjacent longitudinal tracks on said tape.

It is still a further object of the present invention to provide a hybrid disc-tape recording apparatus.

It is a further object of the invention to provide a hybrid disc-tape apparatus in which reading and writing on the tape and disc is synchronous.

The foregoing and other objects of the invention are achieved by a memory drive assembly including a base, a spindle secured to said base and an electric motor stator secured to the base, a hub rotatably supported on said spindle, an electric motor rotor mounted to drive said hub disposed to cooperate with said stator to rotate said hub. Additionally, the invention includes means for mounting memory discs on said hub to form disc apparatus, a magnetic tape receiving drum and heads on said hub to form a tape apparatus, or both, to form a hybrid disc-tape apparatus.

FIG. 1 is an exploded view of the fixed disc embodiment of the invention.

FIG. 2 is a sectional view taken generally along the line 2—2 of FIG. 1.

FIG. 3 is an exploded view of the magnetic tape embodiment of the invention.

FIG. 4 is a sectional view taken generally along the line 4—4 of FIG. 3.

FIG. 5 is an exploded view of a fixed disc-magnetic tape embodiment of the invention.

FIG. 6 is a sectional view taken generally along the line 6—6 of FIG. 5.

FIG. 7 is a plan view of the memory device shown in FIGS. 5 and 6.

FIG. 8 shows the magnetic heads mounted upon the head support of the magnetic tape memory apparatus shown in FIGS. 3–6.

FIG. 9 is a plan view of the timing disc incorporated in each of the embodiments.

FIG. 10 is a plan view showing the photosensing system employed in each of the embodiments for motor control and commutation.

FIG. 11 is a schematic view showing the air flow through the sealed housing.

FIG. 12 shows a section of magnetic tape with record blocks and record tracks schematically shown.

The disc memory embodiment is shown in FIGS. 1 and 2. The disc memory includes a base 11 which may comprise a casting with integral sides 13 and 14 and end 15. The base is adapted to support a disc pack assembly 16 including a plurality of discs 17 mounted upon a hub 18. The housing may be formed with four integral walls or may include a removable end wall 21 which is adapted to mount a head actuator assembly 22 including a plurality of arms 23 on the end of which are mounted magnetic heads 24. The housing may include a cover 26 to form a chamber for enclosing the disc pack.

The heads cooperate with the disc surfaces to read and write and read data on the disc surfaces. The heads move radially inwardly and outwardly to record or reproduce data contained on circular tracks formed on the disc surfaces. A head actuator of the type shown is described more fully in copending application Ser. No. 45,430, filed June 4, 1979. It is, however, to be understood that other type of fixed disc head actuator assemblies can be employed in connection with the disc pack of the present invention. As is well known, such actuators form part of a servo control loop so that the heads can be rapidly indexed to particular tracks as required for the writing or reading information onto the disc surfaces.

Referring now more particularly to FIG. 2, the disc drive is seen to include a spindle 31 suitably secured to the base 11 as, for example, by means of screws 32. The spindle extends upwardly from the base. The spindle includes a flange 33. An electric motor stator 34 is secured to the base by screws 36 and surrounds the flange 38. The motor stator may be a stator purchased from PMI Motors, Model No. U12M4 1/5 HP or any other suitable type of pancake-type stator or other brushless DC motor stator.

A support hub 37 cooperates and is spaced from the upwardly extending cylindrical portion 38 of the spindle 31. Ball bearings are shown mounted between the cylindrical spindle portion 38 and the hub 37. As shown, the bearings 41 and 42 are held on the hub 37 by groove 43 and retained by retainer 44 which is secured to the hub by screws 46. The inner race of the bearings is held in a groove 48 formed in the spindle and are retained by means of a retainer 49 held by screws 51. Thus, the hub is rotatably supported on the spindle by means of the ball bearings 41 and 42. It is to be understood, however, that other types of bearings as, for example, roller bearings, needle bearings, or the like, may be employed.

A rotor plate 52 is mounted on the outwardly extending hub flange 53 by means of screws 54. The rotor is adapted to support spaced permanent magnets 56 which cooperate with the stator to rotate the hub about the spindle at predetermined velocity determined by the number of poles and frequency of the applied electric power. The stator plate extends outwardly and includes a plurality of spaced fins 57 extending downwardly therefrom and adapted to circulate air through the housing in a manner to be presently described.

The hub 37 is adapted to receive one or more discs 58. In the disc memory shown, six such discs are disposed on the hub and spaced from one another by means of spacers 59. The disc assembly is retained on the hub by means of ring 61 secured to the hub by screws 62. Thus, when power is applied to the stator the rotor rotates at a predetermined speed to rotate the discs.

Means are provided on the plate 51 to cooperate with photoelectric means 63 for providing commutating and speed control signals. The derivation of control and commutating signals is described in connection with FIGS. 9 and 10. Brushless motor commutation and speed control are well known, see for example the book entitled "DC Motors, Speed Controls and Servo Systems", Fourth Edition, published by Electro-Craft Corp., 1978.

In FIG. 2, magnetic heads 65 are shown cooperating with the upper and lower surfaces of each of the discs. Such heads are well known and may, for example, be read-write heads known as "Winchester" heads which are widely used in the industry in connection with fixed disc drives. It is apparent that the disc drive can also be used in connection with optical and laser recording.

Thus, it is seen that there has been provided a compact disc drive assembly which is housed in a housing formed from a casting and which includes a cover to provide for a clean atmosphere in which the discs can be rotated. The controls for the positioning of the heads and for the reading and writing information on the discs are well known. Suffice it to say that the heads are stepped radially along the discs to write a plurality of adjacent circular tracks or to read from a plurality of circular tracks. One of the disc surfaces includes control tracks for controlling the head drive to actuate and position the heads.

In accordance with another feature of the invention, substantially the same drive assembly is employed to record data on magnetic tape. The recorded data is in the form of a plurality of adjacent longitudinal tracks of predetermined length forming a block of recorded data with a plurality of blocks spaced along the length of the tape. A typical tape format is shown in FIG. 12. There is shown blocks 66 including a plurality of adjacent tracks 67. The blocks have a length L and width W with a space S between blocks. Each of the tracks can carry identifying information at the beginning and end to identify the block and its beginning and end.

In FIGS. 3 and 4 there is shown a magnetic tape apparatus in accordance with the invention. The same reference numerals have been applied to like parts. The spindle and its mounting, the motor, its stator and rotor, the air impelling means, the photoelectric sensing means, the rotor plate, and the spindle bearings are not described in detail since they are identical to those just described.

In accordance with the present embodiment of the invention, a tape supporting drum 71 is mounted upon the hub 37 by means of screws 72. The periphery of the drum includes a pair of spaced flanges 73 and 74 which are adapted to receive and guide the tape about the drum. In operation, the tape is fed from a suitable tape feed mechanism 76 shown in FIGS. 3, 5 and 7 to be presently described and described in more detail in copending application Ser. No. 45,430 filed June 4, 1979, and assigned to the same assignee. It will become apparent that other types of tape drive may be employed to present the tape stepwise to the drum, that is, the tape is advanced in steps corresponding to the length of a block L plus the distance of separation S between blocks of data. The tape is advanced a predetermined distance and encircles at least 180° of the drum. In the preferred embodiment the tape 77 is supplied from a supply reel 78 in FIG. 7 and encircles the drum 71 and is wound onto a take-up reel 79 as described in said copending application. The tape is maintained at a constant tension on the drum. When the hub is rotated at high speed, the tape is supported spaced from the surface of the drum by a self-generated hydrodynamic air bearing.

Head assemblies 81 in FIGS. 4, 7 and 8 are provided for reading and writing data upon the tape surface. The head assembly 81 may include a single transducer or a plurality of transducers. Preferably, the heads are mounted upon outwardly extending arms 82 formed integral with a hub 83. Referring particularly to FIG. 5, the head assemblies 81 are mounted on the end of the arms by means of screws 84.

The head assemblies 81 extend outwardly through slots 86 formed in the drum with the recording gap of the head extending to the surface of the drum and adapted to read and write data from the adjacent surface of the magnetic tape. Thus, if the tape is wrapped 180° about the drum, the head will engage the tape during 180° of travel and write or read a track of length W corresponding to one-half the circumference of the drum. As seen, the heads are driven via the hub and drum. Rotary transformers 87 and 88 provide means for commutating signals between the rotating heads and the associated apparatus via leads 89.

The heads are mounted for rotation upon a head drive assembly which is adapted to drive the head axially as shown by the arrow 91. More particularly, the hub 83 is mounted upon axial member 92 by means of spaced ball bearings 93 and 94 which have their inner race supported upon member 92 and their outer race engaging and supporting the hub 83. The axial member 92 is guided by spaced guides 96 and 97. A suitable linear drive motor 98 has its plate 99 secured to the insert 101 and its drive shaft 102 secured to the drive member 92 by a set screw 103. The linear drive motor is of the type which serves to axially translate the shaft 102 as the motor is energized. Thus, as the motor is energized, it moves the mounting member 92 axially to move the head assemblies 81 axially as indicated by the arrows 91.

In operation, the main drive motor is turned on and the hub rotates at a predetermined speed rotating the drum which provides the self-generated hydrodynamic air bearing for the tape. The heads then rotate with the drum to write or read longitudinal tracks on the tape. The head drive assembly is translated or moved axially to form adjacent tracks. A plurality of tracks such as 250 tracks for a two inch wide tape are formed for each block. Thereafter, the tape is longitudinally moved to present a new tape portion for a new record block. The writing speed is fast because of the high head velocity. For a track length of 6.5 inches, 190° wrap on a 4.25 diameter drum 40 K bits can be recorded on each track.

Following are specs for a unit utilizing two read heads, two write heads (180° opposed), two transformers, and 180° tape wrap.

| | | |
|---|---|---|
| Recording Density | 6250 | BPI |
| Track Density | 133 | TPI |
| Drum Dia. | 4.25 | Inches |
| Drum Circumference | 13.35 | Inches |
| Tape Wrap | 190° | |
| Track Length | 6.5 | Inches |
| Bits per Track | 40K | Bits |
| Bytes per Track | 5K | Bytes |
| Tracks per Block | 250 | |
| Block Capacity | 1.25 | Megabytes |
| Tape Length | 170 | Feet |
| Blocks per Tape | 300 | |
| Total Capacity | 375 | Megabytes |
| Rotational Speed | 3600 | RPM |
| Head to Track Speed | 800 | In/Sec |
| Data Rate | .625 | Megabytes/Sec |
| Track Read Time | 8 | MS |
| Block Read Time | 2 | Secs |
| Block to Block Access | 500 | MS |
| Full Reel Read Time | 12.5 | Min |
| Full Reel Write Time (Includes Verification) | 25 | Min |
| Access Track to Track | | Sequential |
| Head Widths | | |
| Write | .0075 | |
| Read | .005 | |

Thus, there has been provided a high density, high speed, relatively inexpensive tape apparatus.

In accordance with a further feature of the invention, there is provided a memory device which incorporates both disc and tape capability in a hybrid apparatus whereby data can be transferred between the discs and tape on the same apparatus to provide for dynamic back-up storage on the magnetic tape of the data on the disc. The magnetic tape is a much cheaper medium and has a higher capacity.

Referring to FIGS. 5 and 6, a hybrid unit is shown. Like reference numerals have been applied to like parts. It is seen that the unit includes both a slotted tape drum which receives the magnetic tape and accommodates the magnetic heads and arms and three discs which are adapted to operate with heads mounted on an actuator.

It is seen that as the support hub is rotated, it rotates the discs 58 so that they may cooperate with the heads 65 as well as rotating the tape heads 81 which cooperate with the associated tape 78 and the tape drum 71 provides the hydrodynamic support for the tape. Thus, circular record tracks are written and read on the disc surfaces simultaneously with the writing and reading of longitudinal spaced tracks in the magnetic tape recording blocks.

Previously described was the motor and its commutating and control signal generating means. The bottom of the rotor is provided with opaque and reflecting surfaces in a predetermined pattern such as the pattern shown in FIG. 9. There are patterns 111 which define four sectors. These sectors in cooperation with the associated photoelectric assembly provide commutating signals. A speed control pattern 112 is also provided and it cooperates with photoelectric means to provide control signals. The patterns 111 and 112 are read by means of phototransducer assemblies 113 and 114, respectively. The phototransducer 114 includes a light source and a transducer for receiving reflected light and providing output signals indicative of the pattern 112. The combination of light sources and phototransducers 114 serves to read the sectors 111 and provide output commutating signals. The cells are spaced so two cells either cooperate with the reflector sector or non-reflective sector at any one time. The output signals are applied to associated circuits which provide power to the motor stator and control the speed.

Referring to FIGS. 10 and 11, the air circulation and cleaning system is more clearly shown. Air is pumped by means of the fins 57 previously described and the rotating discs whereby it is driven centrifugally outward. Makeup air enters through the filter 117. The air flows through the filter 118, downwardly through the chamber 119, into chamber 121. The air is drawn through opening 122 by the lower pressure at the axis. The circulating air and filtering system serves to provide clean air within the housing to remove any magnetic dust particles or other contaminants which are generated within the housing during operation of the mechanical apparatus.

Thus, it is seen that there has been provided an improved memory system. The system operates as a fixed disc memory, a magnetic tape memory adapted to read and write blocks of material at fast rates and a hybrid memory adapted to provide both disc and tape capabilities. The system is compact and inexpensive and provides capability for high density recording on a tape medium with large storage capacity.

What is claimed is:
1. A magnetic memory comprising a base plate,
   a spindle secured to said base extending upwardly therefrom,
   an electric motor stator secured to said base,
   a support hub supported by said spindle,
   bearing means disposed between said hub and spindle to support said hub on the spindle and allow the hub to rotate relative to said spindle,
   an electric motor rotor mounted on said hub in cooperative relationship to said stator whereby to rotate the hub relative to the spindle,
   a tape receiving and supporting drum mounted on said hub, said tape receiving and supporting drum including tape guide means whereby the tape is guided over the surface of said drum and wrapped over a predetermined circumference of the drum,
   a magnetic head drive and support assembly mounted on said spindle to support magnetic heads with their recording gap in cooperative relationship with the tape on said drum and for rotation with said drum, said assembly including means to move said heads axially with respect to the drum whereby said heads read and write longitudinal tracks of predetermined length laterally spaced next to one another in a record block on said tape, said block having a predetermined number of laterally spaced record tracks.

2. A magnetic memory device as in claim 1 in which said magnetic head drive and support assembly comprises
head mounting means including a hub and radially extending arms adapted to receive the head, and
means mounted on said spindle for moving said head mounting means axially to move the heads and read and write said plurality of laterally spaced tracks in said recorded block.

3. A magnetic memory comprising a base,
a spindle secured to said base extending upwardly therefrom,
an electric motor stator secured to said base,
a support hub supported by said spindle,
bearing means disposed between said hub and spindle to support said hub on the spindle and allow the hub to rotate relative to said spindle,
an electric motor rotor mounted on said hub in cooperative relationship to said stator whereby to rotate the hub relative to the spindle,
at least one magnetic disc mounted on said hub for rotation therewith,
one or more magnetic heads for cooperation with said disc to read or write information on said disc,
a tape receiving and supporting drum mounted on said support hub, said tape receiving and supporting drum including tape guide means whereby the tape is guided over the surface of said drum and wrapped over a predetermined circumference of said drum,
a magnetic head drive and support assembly mounted on said spindle to support magnetic heads with their recording gap in cooperative relationship with the tape on said drum and for rotation with said drum and to move said heads axially with respect to the drum whereby said heads read or write longitudinal tracks of predetermined length laterally spaced next to one another in a record block on said tape, said block having a predetermined number of laterally spaced record tracks.

4. A magnetic tape apparatus comprising a base,
a magnetic tape receiving and supporting drum rotatably supported from said base and adapted to receive and support magnetic tape on the surface of the drum with the tape wrapped over a predetermined circumference of said drum,
means for rotating said drum to support said tape on a hydrodynamic air bearing, and
a magnetic head drive and support assembly supported from said base to support magnetic heads with their recording gap in cooperative relationship with the tape on said drum and for rotation with said drum and to move said heads axially with respect to the drum whereby said head write and read blocks of longitudinal laterally spaced adjacent tracks of predetermined length on said tape.

5. A magnetic tape apparatus as in claim 4 in which said magnetic head drive and support assembly comprises
head mounting means including a hub and radially extending arms adapted to receive the head, and
means supported from said base for moving said head mounting means axially to move the heads and form said plurality of laterally spaced adjacent tracks in said record block.

6. A magnetic tape apparatus as in claim 4 including means for longitudinally moving said tape to read and write longitudinally spaced record blocks on said tape.

7. A hybrid memory comprising a base,
a magnetic tape receiving and supporting drum and a disc hub rotatably supported from said base, said drum adapted to receive and support magnetic tape on the surface of the drum with the tape wrapped over a predetermined circumference of said drum and said hub adapted to receive and support at least one recording disc,
means for rotating said drum and hub to support the tape on a hydrodynamic air bearing and to rotate the disc,
means for presenting heads to said disc to write and read information on record tracks on said disc,
a magnetic head drive and support assembly supported from said base to support magnetic heads with their recording gap in cooperative relationship with the tape on said drum and for rotation with said drum and to move said heads axially with respect to the drum whereby said heads write and read blocks of longitudinal laterally spaced adjacent tracks of predetermined length on said tape.

8. A magnetic tape apparatus as in claim 7 in which said magnetic head drive and support assembly comprises
head mounting means including a hub and radially extending arms adapted to receive the head, and
means supported from said base for moving said head mounting means axially to move the heads and form said plurality of adjacent tracks in said record block.

9. A hybrid memory as in claim 7 in which the tape magnetic heads and the disc magnetic heads write and read data synchronously.

10. A magnetic tape apparatus comprising a base,
a magnetic tape receiving and supporting drum rotatably supported from said base and adapted to receive and support magnetic tape on the surface of the drum with the tape wrapped over a predetermined circumference of said drum,
means for rotating said drum to support said tape on a hydrodynamic air bearing,
means for supporting a plurality of magnetic heads with their recording gap in cooperative relationship with the tape wound on said drum and for rotation with said drum to write and read longitudinal tracks of predetermined length on said tape,
means supported on said base for moving said heads in an axial direction to record adjacent laterally spaced longitudinal tracks to form a record block,
bearing means permitting said heads to rotate relative to said means for moving said heads, and
rotary transformer means for supplying and receiving signals from said heads.

11. A magnetic tape apparatus as in claim 10 including at least one memory disc mounted for rotation with said drum, and at least one magnetic head
means for bringing said magnetic head into cooperative relationship with said disc.

12. A magnetic tape apparatus as in claim 11 in which the tape magnetic heads and the disc magnetic heads write and read data synchronously.

13. A magnetic tape apparatus comprising a rotary magnetic tape receiving and supporting drum, means for presenting longitudinally spaced portions of tape to said drum, at least two magnetic heads mounted for rotation with said drum to cooperate with the tape supported on the drum to read and write on said tape portions means for moving said heads longitudinally along the drum whereby to record a plurality of laterally spaced longitudinal tracks on said tape portion supported on said drum whereby to form a record block comprising a plurality of parallel adjacent record tracks on said tape portion.

* * * * *